(12) United States Patent
Hong

(10) Patent No.: US 7,790,488 B2
(45) Date of Patent: Sep. 7, 2010

(54) METHOD FOR FABRICATING AN IN-PLANE SWITCHING MODE LIQUID CRYSTAL DISPLAY DEVICE

(75) Inventor: Hyung Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/461,252

(22) Filed: Aug. 5, 2009

(65) Prior Publication Data

US 2010/0022042 A1   Jan. 28, 2010

Related U.S. Application Data

(62) Division of application No. 11/298,618, filed on Dec. 12, 2005, now Pat. No. 7,589,806.

(30) Foreign Application Priority Data

Dec. 29, 2004   (KR)   ............... 10-2004-0114832

(51) Int. Cl.
*H01L 21/00*   (2006.01)
(52) U.S. Cl. ............... 438/30; 257/E21.001; 438/149
(58) Field of Classification Search ............... 438/30, 438/141–166
See application file for complete search history.

(56) References Cited

U.S. PATENT DOCUMENTS

| | | | |
|---|---|---|---|
| 6,281,952 B1 * | 8/2001 | Okamoto et al. | 349/12 |
| 6,650,385 B1 * | 11/2003 | Liu | 349/113 |
| 7,064,802 B2 * | 6/2006 | Lin | 349/141 |
| 7,327,428 B2 * | 2/2008 | Yamazaki et al. | 349/141 |
| 7,663,596 B2 * | 2/2010 | Nam et al. | 345/102 |
| 2005/0140902 A1 * | 6/2005 | Yang et al. | 349/141 |
| 2005/0231673 A1 * | 10/2005 | Yamazaki et al. | 349/139 |
| 2006/0044496 A1 * | 3/2006 | Tsuchiya | 349/114 |
| 2006/0077328 A1 * | 4/2006 | Jung et al. | 349/128 |

* cited by examiner

*Primary Examiner*—Savitri Mulpuri
(74) *Attorney, Agent, or Firm*—McKenna Long & Aldridge LLP

(57) ABSTRACT

An in-plane switching mode liquid crystal display (LCD) device, which reduces loss in transmittance and improves reflectance, and a method for fabricating the same are disclosed. The in-plane switching mode LCD device includes gate and data lines orthogonally crossing each other on a first substrate to define pixel regions having reflection portions and transmission portions; thin film transistors formed at the crossing of the gate and data lines; common electrodes formed at the transmission portions of the pixel regions; reflection electrodes formed at the reflection portions of the pixel regions; pixel electrodes formed parallel with the common electrodes at the transmission portions and formed above the reflection electrodes at the reflection portions; a second substrate facing and attached to the first substrate; a liquid crystal layer interposed between the first and second substrates; and first and second polarizing films respectively attached to outer surfaces of the first and second substrates.

15 Claims, 15 Drawing Sheets

FIG. 9

| | | upper POL | liquid crystal (λ/4) | reflection electrode | liquid crystal (λ/4) | upper POL |
|---|---|---|---|---|---|---|
| reflection portions | OFF | ←→ | ↻ | ↻ | ↕ | |
| | ON | ←→ | ←→ | ←→ | ←→ | ←→ |

FIG. 10

| | | lower POL | HWP(λ/2) | liquid crystal (λ/4) | upper POL |
|---|---|---|---|---|---|
| transmission portions | OFF | ↕ | ←→ | ↕ | |
| | ON | ↕ | ←→ | ←→ | ←→ |

METHOD FOR FABRICATING AN IN-PLANE SWITCHING MODE LIQUID CRYSTAL DISPLAY DEVICE

CROSS-REFERENCE TO RELATED APPLICATIONS

This application is a Divisional of application Ser. No. 11/298,618 filed Dec. 12, 2005 now U.S. Pat. No. 7,589,806, now allowed; which claims priority to Korean Patent Application No. 10-2004-114832, filed Dec. 29, 2004 all of which are hereby incorporated by reference for all purposes as if fully set forth herein.

BACKGROUND OF THE INVENTION

1. Field of the Invention

The present invention relates to an in-plane switching mode liquid crystal display device and a method for fabricating the same, and more particularly to an in-plane switching mode liquid crystal display device, which reduces loss in transmittance and improves reflectance, and a method for fabricating the same.

2. Discussion of the Related Art

A liquid crystal display (LCD) device, one type of flat display device that is receiving a great deal of public attention, changes optical anisotropy by applying electric fields to liquid crystal having both fluidity of liquid and optical characteristics of crystal. Compared to a related art cathode ray tube, the LCD device has a lower power consumption rate and a small volume and is produced into a large-size and high-definition unit, thus being widely used.

Such a liquid crystal device has a structure in which a color filter array substrate serving as an upper substrate and a thin film transistor (TFT) array substrate serving as a lower substrate face each other and liquid crystal having dielectric anisotropy is interposed between the two substrates. The liquid crystal display device is driven such that TFTs attached to several hundreds of thousands pixels are switched on and off through address lines for selecting the pixels and a voltage is applied to the corresponding pixels.

The liquid crystal display devices are driven in various modes according to characteristics of liquid crystal and structures of a pattern.

Specifically, there are a twisted nematic (TN) mode, a multi-domain mode, an optically compensated birefringence (OCB) mode, and an in-plane switching mode. In the TN mode, liquid crystal directors are twisted at an angle of 90°, and a voltage is applied to the liquid crystal directors so that the liquid crystal directors can be controlled. In the multi-domain mode, one pixel is divided into several domains, and main visual field angles of the domains have different directions, thereby implementing a wide visual field angle. In the OCB mode, a compensating film is attached to a substrate so as to compensate for the variation in phase of light according to travel directions of the light. In the in-plane switching mode, two electrodes are formed on one substrate such that liquid crystal directors are twisted on the parallel planes of orientation films.

The liquid crystal display devices are divided into transmissible liquid crystal display devices using a backlight as a light source, reflective liquid crystal display devices using external natural light as a light source, and semi-transmissible light crystal display devices proposed to overcome drawbacks of the transmissible and reflective liquid crystal display devices, such as a high power consumption rate of the transmissible liquid crystal display devices due to use of the backlight and a difficulty of using the reflective liquid crystal display devices when the external natural light has a poor brightness.

The above-mentioned semi-transmissible light crystal display device simultaneously has reflection portions and transmission portions in unit pixels, thus interchangeably serving as reflective and transmissible light crystal display devices as occasion demands.

Transmission portions of the transmissible and semi-transmissible light crystal display devices cause light emitted from the backlight through a lower substrate to be incident upon a liquid crystal layer to increase luminance, and reflection portions of the reflective and semi-transmissible light crystal display devices reflect the external natural light incident through an upper substrate, when the external natural light has a high brightness, to increase luminance.

Here, in order to respectively maximize the efficiency of the reflection and transmission portions, a dual cell gap structure, in which the cell gap of the transmission portions is approximately twice that of the reflection portions, has been proposed.

A method for applying a semi-transmission mode in-plane switching mode liquid crystal display device is proposed. In this case, electrodes of the liquid crystal display device are configured in the dual cell gap structure, thereby maximizing the efficiency of the semi-transmission mode.

Hereinafter, with reference to accompanying drawings, an in-plane switching mode liquid crystal display device employing the semi-transmission mode will be described.

FIG. 1 is a plan view of a related art in-plane switching mode liquid crystal display device, and FIG. 2 is a sectional view taken along line I-I' of FIG. 1.

The in-plane switching mode liquid crystal display device having pixel regions, each divided into reflection portions (R) and a transmission portion (T), as shown in FIGS. 1 and 2, comprises a TFT array substrate 11 having a plurality of lines and TFTs, a color filter array substrate 21 facing the TFT array substrate 11, and a liquid crystal layer 31 interposed between the substrates 11 and 21. The liquid crystal display device employs a dual cell gap structure in which the cell gap of the liquid crystal layer 31 at the transmission portions (T) is twice that of the liquid crystal layer 31 at the reflection portion (R).

Specifically, the TFT array substrate 11 comprises gate lines 12 and data lines 15 orthogonally crossing each other to define pixel regions, TFTs obtained by laminating gate electrodes 12a, a gate insulating layer 13, a semiconductor layer 14 and source/drain electrodes 15a and 15b at the crossing of the two lines 12 and 15, reflection electrodes 60 formed at the reflection portions (R) for reflecting external light, a passivation layer 16 formed on the data lines 15 and the reflection electrodes 60, and common electrodes 24 and pixel electrodes 17 crossing each other on the passivation layer 16 for generating transversal electric fields.

While the gate insulating layer 13 and the passivation layer 16 at the reflection portions (R) remain, the gate insulating layer 13 and the passivation layer 16 at the transmission portions (T) are removed, thereby forming a dual cell gap structure. Since the total sum of the thicknesses of the removed gate insulating layer 13 and passivation layer 16 is equal to that of the liquid crystal layer 31, the liquid crystal cell gap at the transmission portions (T) is twice the liquid crystal cell gap at the reflection portions (R).

As mentioned above, the cell gap (d1) at the transmission portions (T) and the cell gap (d2) at the reflection portions (R) is in the ratio of approximately 2 to 1. Thereby, ON/OFF modes of the transmission portions (T) and the reflection portions (R) are matched with each other.

Specifically, light incident upon the reflection portions (R) and light incident upon the transmission portions (T) simultaneously reach the surface of a screen. Natural light incident from the outside upon the reflection portions (R) reciprocates in the liquid crystal layer 31 and reaches the surface of the screen, and light incident from a backlight upon the transmission portions (T) passes through the liquid crystal layer 31 at the transmission portions (T) having a cell gap twice that of the liquid crystal layer 31 at the reflection portions (R) and reaches the surface of the screen. Accordingly, the above two lights simultaneously reach the surface of the screen.

The reflection electrodes 60 are made of Al, Al alloy, or Ag, and reflect light incident from an external light source, thereby displaying an image on the screen.

In the above device having the dual cell gap structure at the reflection and transmission portions (R and T), the common electrodes 24 and the pixel electrodes 17 are disposed in parallel at both edges of the transmission portions (T) without the passivation layer 16 and the reflection portions (R) with the passivation layer 16, thereby respectively forming first transversal electric fields (E1) and second transversal electric fields (E2). Specifically, the first transversal electric fields (E1) are formed throughout the cell gap (d1) of the transmission portions (T) by the interaction between the first common electrode 24a and the first pixel electrode 17a and the interaction between the second common electrode 24b and the second pixel electrode 17b, and the second transversal electric fields (E2) are formed throughout the cell gap (d2) of the reflection portions (R) by the interaction between the first pixel electrode 17a and the second common electrode 24b and the interaction between the second pixel electrode 17b and the first common electrode 24a.

When an external light source is not present, the liquid crystal display device is driven in a transmission mode by the first transversal electric fields (E1) formed at the transmission portions (T), and when an external light source is present, the liquid crystal display device is driven in a reflection mode by the second transversal electric fields (E2) formed at the reflection portions (R).

Widths of the transmission portions (T) and the reflection portions (R) are varied according to the size of the liquid crystal display device, which is substantially manufactured, or the number of pixels of the liquid crystal display device. In consideration of the transmittance of the liquid crystal display device, preferably, the widths of the transmission portions (T) and the reflection portions (R) are in the ratio of 1:1 to 3:1.

The color filter array substrate 21 comprises black matrices 22 for preventing light leakage, and a color filter film 23 formed between the black matrices 22.

For reference, although not shown in the drawings, the liquid crystal display device further comprises orientation films attached to inner surfaces of the two substrates 11 and 21 for arranging molecules of the liquid crystal layer 31 in a designated direction, polarizing films attached to outer surfaces of the two substrates 11 and 21 for controlling an optical axis of light, and a phase contrast plate interposed between the color filter array substrate 21 and the polarizing film for delaying a phase difference.

The above-mentioned related art in-plane switching mode liquid crystal display device has a problem, as follows.

When each of the reflection electrodes made of metal is disposed between the corresponding common electrodes and pixel electrodes, the reflection electrodes distort the transversal electric fields generated between the common electrode and the pixel electrode, thereby causing a difficulty in arranging liquid crystal molecules in a desired direction.

SUMMARY OF THE INVENTION

Accordingly, the present invention is directed to an in-plane switching mode liquid crystal display device in which a Vcom signal is applied to reflection electrodes and pixel electrodes are additionally formed above the reflection electrodes so that liquid crystal molecules above the reflection electrodes can be arranged in a desired orientation by transversal electric fields, each generated between the reflection electrode and the pixel electrode, to have improved reflectance, and a method for fabricating the same.

Additional advantages and features of the invention will be set forth in the description which follows, and in part will be apparent from the description or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an in-plane switching mode liquid crystal display device comprises gate lines and data lines orthogonally crossing each other on a first substrate for defining pixel regions having reflection portions and transmission portions; thin film transistors at the crossings of the gate lines and the data lines; common electrodes formed at the transmission portions of the pixel regions; reflection electrodes formed at the reflection portions of the pixel regions; pixel electrodes formed parallel with the common electrodes at the transmission portions and formed above the reflection electrodes at the reflection portions; a second substrate attached to the first substrate; a liquid crystal layer interposed between the first and second substrates; and first and second polarizing films respectively attached to outer surfaces of the first and second substrates.

In another aspect of the present invention, there is provided a method for fabricating an in-plane switching mode liquid crystal display device comprising: forming gate lines on a first substrate; forming a gate insulating layer on the overall surface of the first substrate including the gate lines; forming data lines crossing the gate lines for defining pixel regions that are divided into reflection portions and transmission portions; forming thin film transistors at the crossings of the gate lines and the data lines; forming common electrodes at the transmission portions of the pixel regions; forming reflection electrodes formed at the reflection portions of the pixel regions; forming a passivation layer on the overall surface of the first substrate including the reflection electrodes; forming pixel electrodes on the passivation layer parallel with the common electrodes and pixel electrodes overlapping with the reflection electrodes; attaching a second substrate to the first substrate, and forming a liquid crystal layer therebetween; and attaching first and second polarizing films respectively to outer surfaces of the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIG. 9 is a table illustrating the variation in the polarized state of reflection portions of the liquid crystal display device of the present invention;

FIG. 10 is a table illustrating the variation in the polarized state of transmission portions of the liquid crystal display device of the present invention;

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
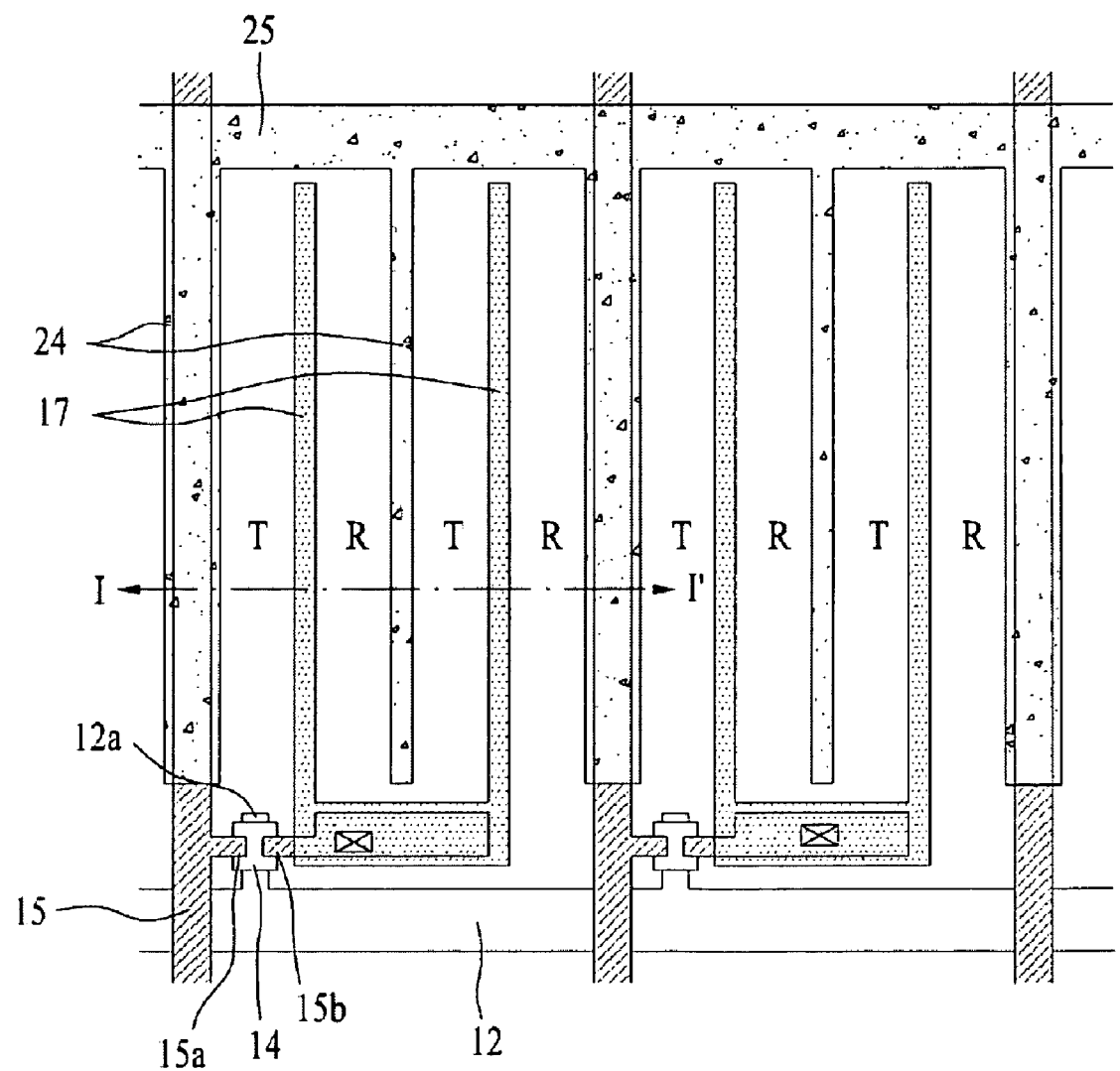
FIG. 1 is a plan view of a related art in-plane switching mode liquid crystal display device.
Figure 2:
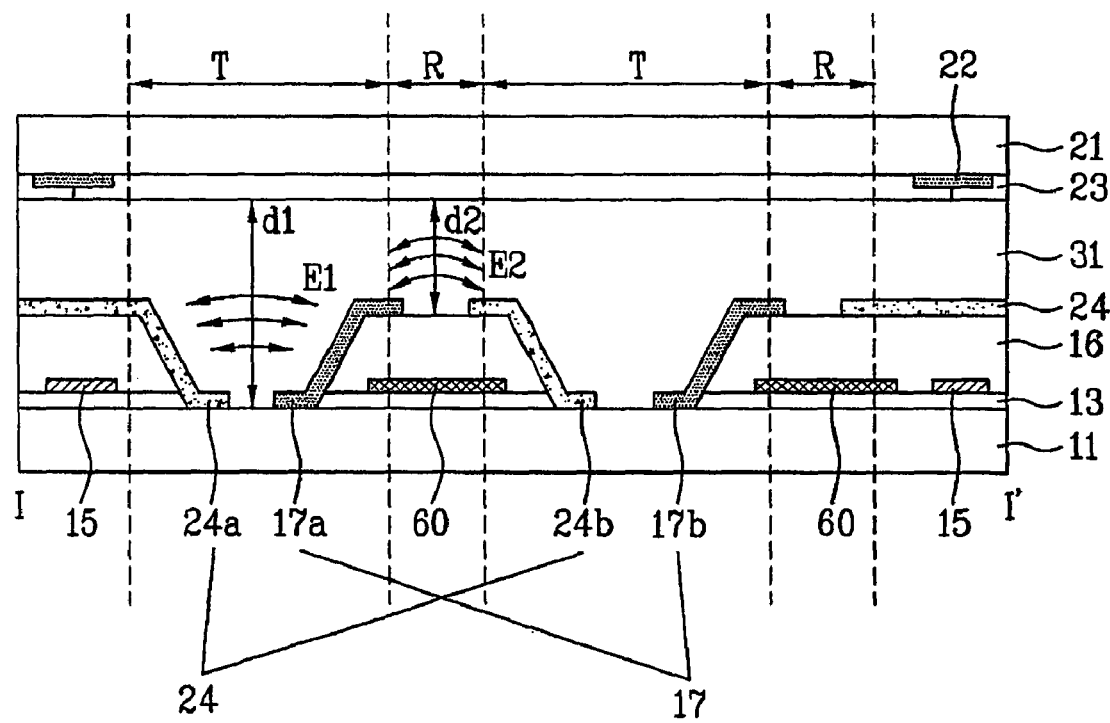
FIG. 2 is a sectional view taken along line I-I' of FIG. 1.
Figure 3:
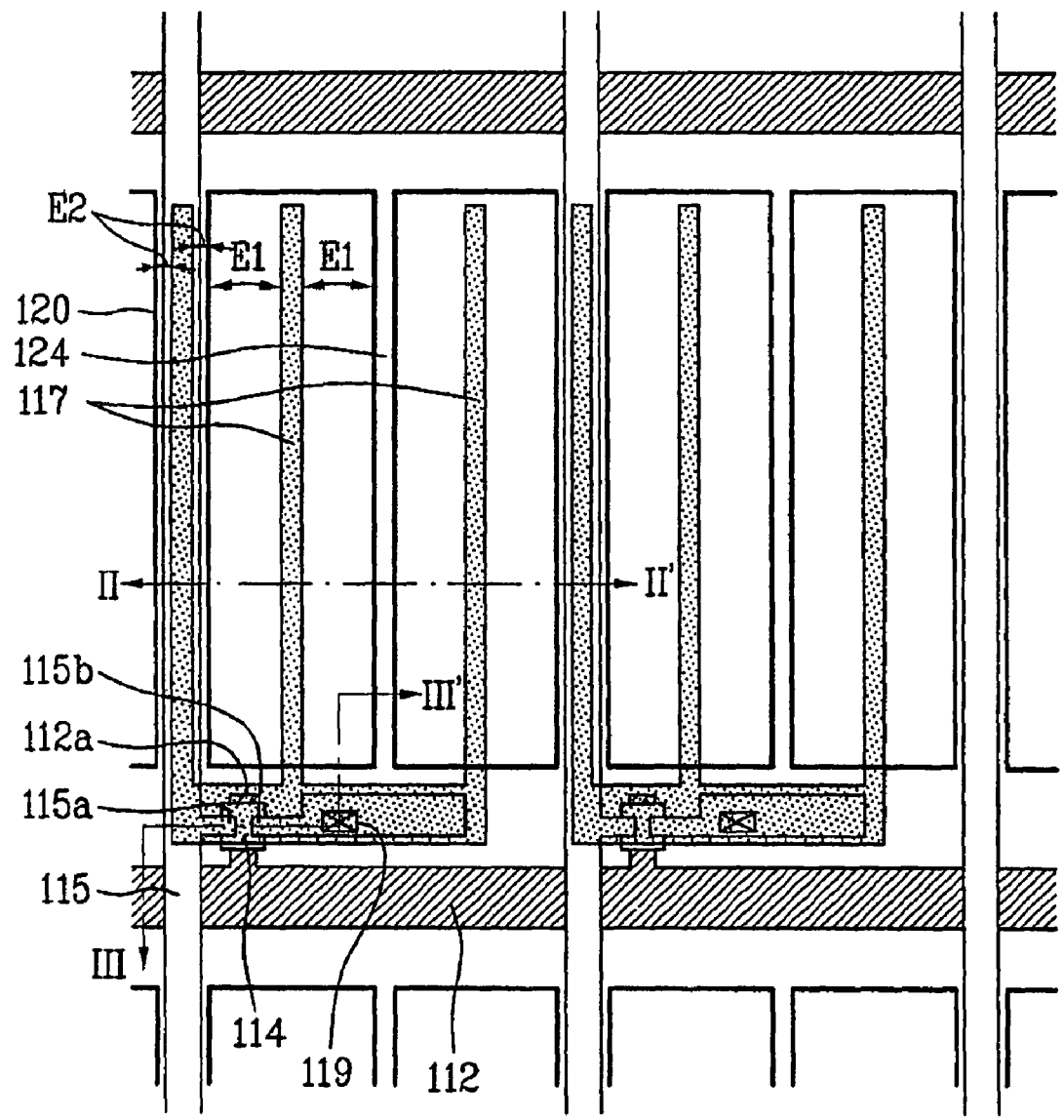
FIG. 3 is a plan view of an in-plane switching mode liquid crystal display device in accordance with a first embodiment of the present invention.
Figure 4:
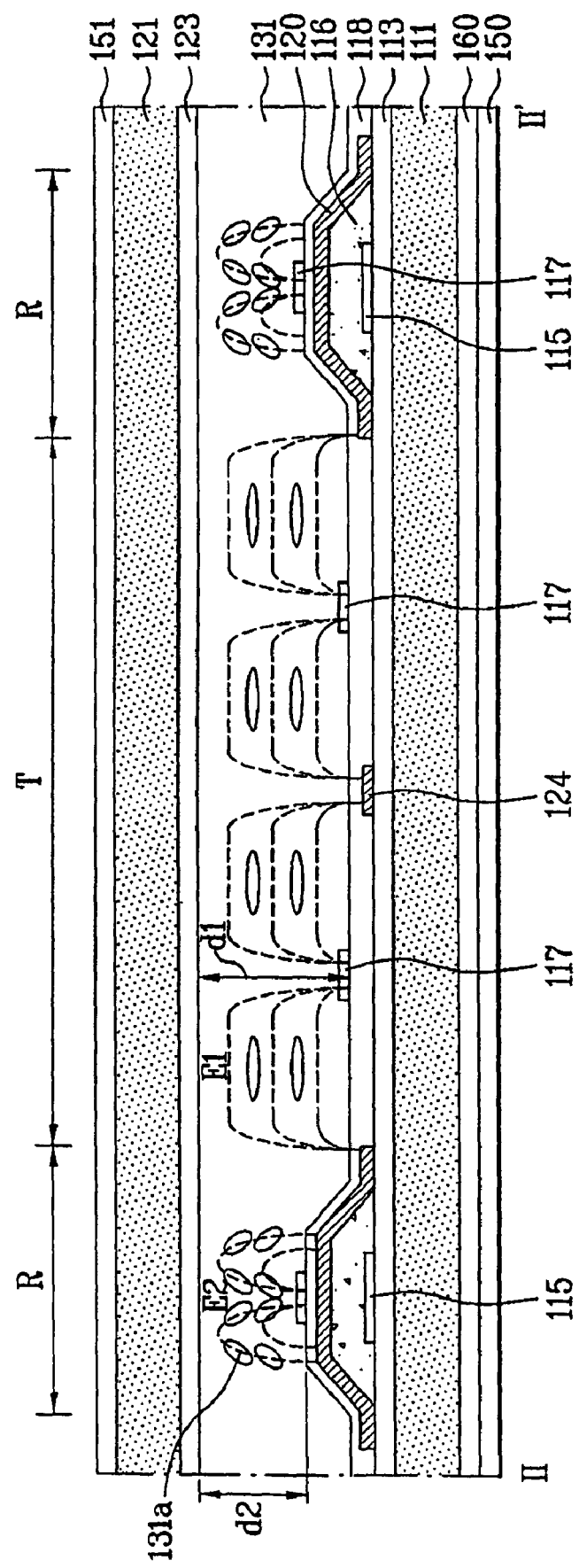
FIG. 4 is a sectional view taken along line II-II' of FIG. 3.

FIG. 3 is a plan view of an in-plane switching mode liquid crystal display device in accordance with a first embodiment of the present invention, and FIG. 4 is a sectional view taken along line II-II' of FIG. 3.

Figure 5:
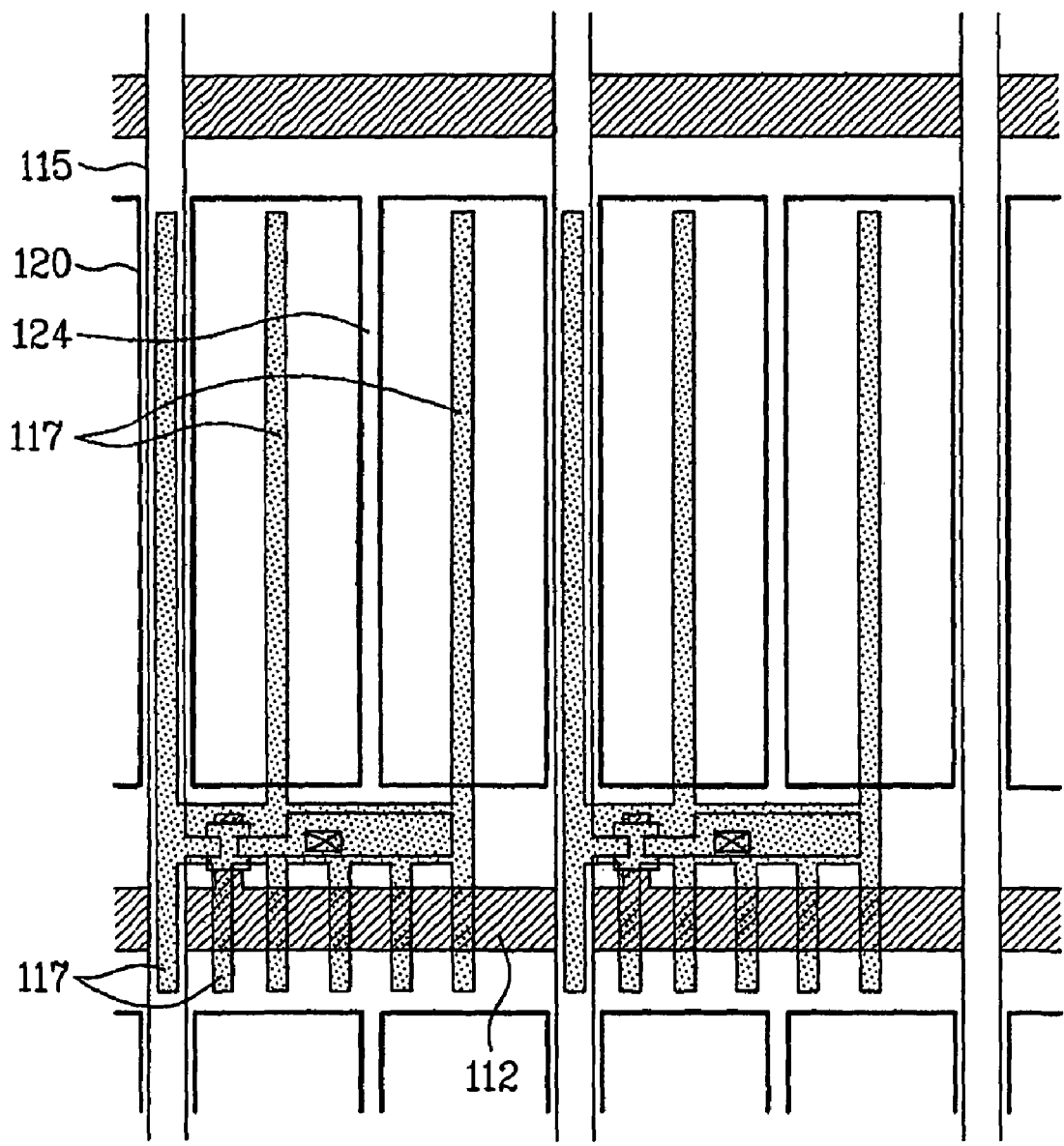
FIG. 5 is a plan view of an in-plane switching mode liquid crystal display device in accordance with a second embodiment of the present invention.
Figure 6:
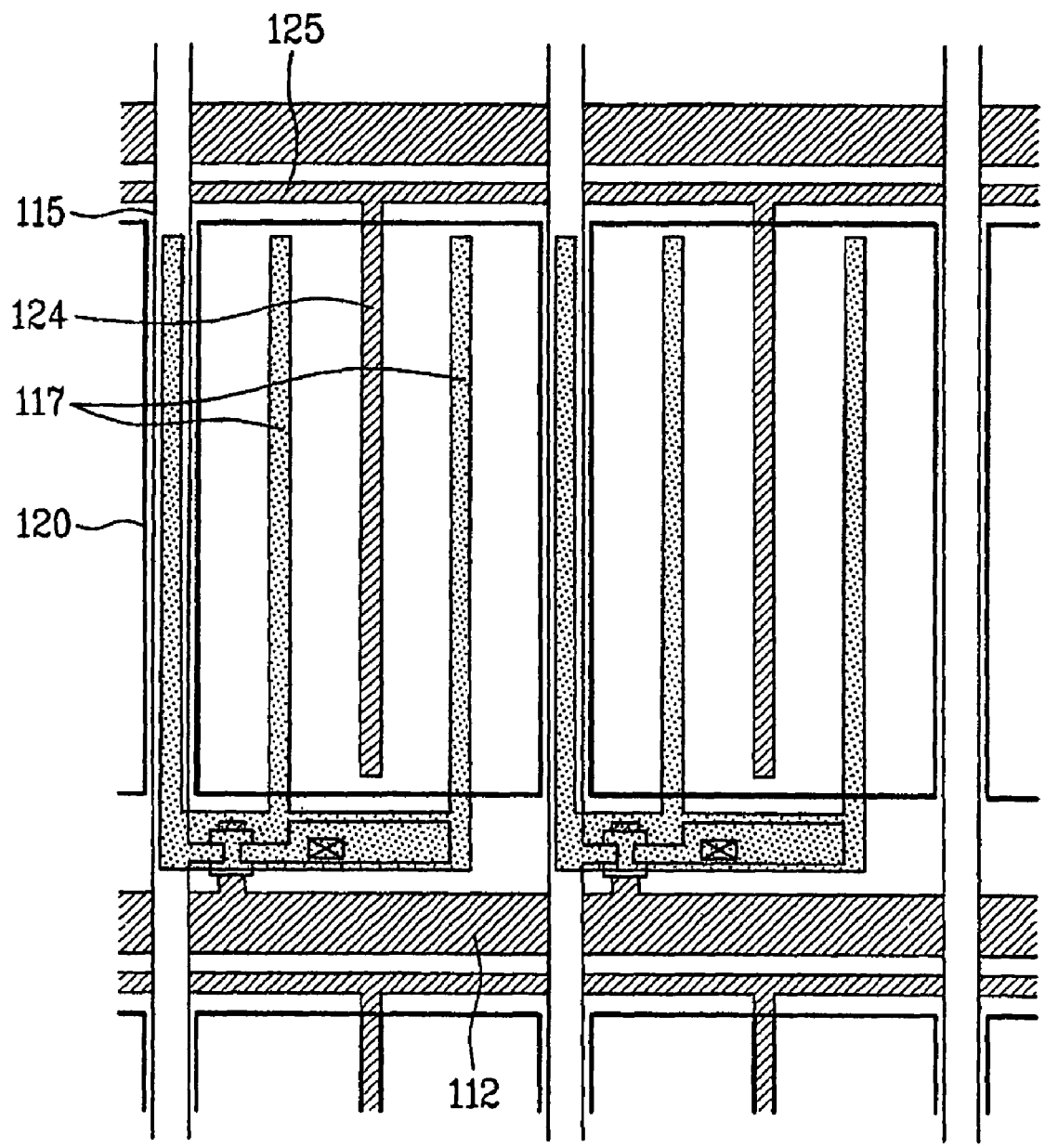
FIG. 6 is a plan view of an in-plane switching mode liquid crystal display device in accordance with a third embodiment of the present invention.

FIG. 5 is a plan view of an in-plane switching mode liquid crystal display device in accordance with a second embodiment of the present invention, and FIG. 6 is a plan view of an in-plane switching mode liquid crystal display device in accordance with a third embodiment of the present invention.

The in-plane switching mode liquid crystal display device of the present invention is divided into reflection portions (R) corresponding to edges of pixel regions and transmission portions (T) corresponding to inner parts of the pixels regions. The liquid crystal display device comprises a TFT array substrate 111, a color filter array substrate 121, and a liquid crystal layer 131 having a dual cell gap structure interposed between the two substrates 111 and 121.

As shown in FIGS. 3 and 4, the TFT array substrate 111 comprises gate lines 112 and data lines 115 orthogonally crossing each other for defining unit pixel regions, a gate insulating layer 113 laminating between them for insulating the gate and data lines 112 and 115 from each other, TFTs formed at the crossings of the gate and data lines 112 and 115, an organic insulating layer 116 and reflection electrodes 120 formed at the edges of the pixel regions (hereinafter, referred to as "the reflection portions"), common electrodes 124 formed at the inner parts of the pixel regions (hereinafter, referred to as "the transmission portions"), pixel electrodes 117 formed at the reflection and transmission portions, and a passivation layer 118 formed on the overall surface of the TFT array substrate 111 including the reflection electrodes 120 for insulating the pixel electrodes 117 from the reflection and common electrodes 120 and 124.

The color filter array substrate 121 having black matrices 122 and a color filter layer 123 is attached to the TFT array substrate 111 such that the two substrates 121 and 111 face each other, and the liquid crystal layer 131 is interposed between the two substrates 121 and 111. First and second polarizing films 150 and 151 are respectively attached to outer surfaces of the two substrates 111 and 121. A compensating film 160 is interposed between the TFT array substrate 111 and the first polarizing film 150, thereby ensuring black characteristics of the transmission mode.

The pixel electrodes 117 at the transmission portions are disposed parallel with the common electrodes 124 to generate first transversal electric fields (E1), and the pixel electrodes 117 at the reflection portions are disposed above the reflection electrodes 120 to generate second transversal electric fields (E2).

That is, the liquid crystal display device of the present invention is driven in a semi-transmission mode. When an external light source is not present, the liquid crystal display device is driven in a transmission mode by the first transversal electric fields (E1) formed at the transmission portions (T), and when an external light source is present, the liquid crystal display device is driven in a reflection mode by the second transversal electric fields (E2) formed at the reflection portions (R).

Specifically, the TFTs are formed at the crossings of the gate and data lines 112 and 115, and control a voltage according to addressing signals so that the voltage is applied or not applied to the pixel electrodes. Each of the TFTs comprises a gate electrode 112a branched from the gate line 112, the gate insulating layer 113 laminated on the gate electrode 112a, a semiconductor layer 114 having an island shape formed by depositing amorphous silicon (a-Si:H) on the gate electrode 112a, and source and drain electrodes 115a and 115b branched from the data line 115 and formed on the semiconductor layer 114.

The reflection electrodes 120 are overlapped on the reflection potions (edges of the pixel regions) including the regions in which the gate and data lines 112 and 115, and the TFTs are formed. The reflection electrodes 120 are formed at the reflection portions (R) and reflect external natural light, incident from the color filter array substrate 121, towards the color filter array substrate 121, thereby displaying an image.

A Vcom voltage is applied to the reflection electrodes 120 so that the second transversal electric fields (E2), each generated between the reflection electrode 120 and the pixel electrode 117 above the reflection electrodes 120, thereby controlling the orientation of the liquid crystal when the liquid crystal display device is driven in the reflection mode. The passivation layer 118 made of an inorganic insulating material is generated between the reflection electrodes 120 and the pixel electrodes 117, thereby insulating the reflection electrodes 120 and the pixel electrodes 117 from each other.

The dimensions of the reflection electrodes 120 are varied according to the ratio of the reflection portions (R) to the transmission portions (T). The reflection electrodes 120 are made of metal having a high reflectance, such as aluminum (Al), copper (Cu), and chrome (Cr).

The common electrodes 124 and the pixel electrodes 117 are disposed in parallel at the transmission portions so that the first transversal electric fields (E1) are generated between the common electrodes 124 and the pixel electrodes 117 and control the orientation of the liquid crystal when the liquid crystal display device is driven in the transmission mode. The common electrodes 124 and the pixel electrodes 117 are insulated from each other by the passivation layer 118, and regions, each generated between the common electrode 124 and the pixel electrode 117, becomes the transmission portions (T).

The common electrodes 124 are formed in the same layer as that of the reflection electrodes 120, as shown in FIG. 3, thereby receiving a Vcom signal. Otherwise, reflection electrodes 120 are formed in a different layer from that of the common electrodes 124, as shown in FIG. 6, thereby receiving a Vcom signal from an external driving circuit connected to the reflection electrodes 120.

In order to form the reflection and common electrodes 120 and 124 in different layers, as shown in FIG. 6, after common lines 125 and the common electrodes 124 are formed simultaneously with the formation of the gate lines 112, the reflection electrodes 120 are formed thereon. That is, the gate lines 112, the common lines 125 parallel with the gate lines 112, and the common electrodes 124 extended from the common lines 125 are simultaneously formed on the TFT array substrate 111, an insulating layer is formed thereon, and the reflection electrodes 120 are formed by depositing metal having excellent reflection characteristics on the insulating layer and patterning the deposited metal layer. The reflection electrodes 120 overlap the common lines 125, thereby ensuring the dimensions of the reflection portions (R).

As shown in FIG. 3, the pixel electrodes 117 at the transmission portions are disposed parallel with the common electrodes 124, and the pixel electrodes 117 at the reflection portions are disposed above the reflection electrodes 120. Otherwise, as shown in FIG. 5, the pixel electrodes 117 may be additionally disposed above the reflection electrodes 120 above the gate lines 112. Thereby, the second transversal electric fields, each caused due to the interaction between the reflection electrode 120 and the pixel electrode 117, are formed above the gate lines 112, thereby improving the efficiency of the reflection mode.

That is, in addition to the pixel electrodes 117 disposed above the reflection electrodes 120 above the data lines 115, the pixel electrodes 117 may be disposed above the reflection electrodes 120 above the gate lines 112. In this case, the pixel electrodes 117 on the TFT array substrate 111 are disposed in one direction, thereby causing the liquid crystal molecules in the reflection and transmission portions (R and T) to be arranged in the same orientation. All the pixel electrodes 117 of one pixel region are integrated, and are connected to the drain electrode 115b of the corresponding TFT.

The in-plane switching mode liquid crystal display device has a dual cell gap structure. Here, the organic insulating layer 116 is formed at the reflection portions (R), thereby causing the reflection portions (R) and the transmission portions (T) to have different liquid crystal cell gaps. Since the organic insulating layer 116 has the same thickness as the liquid crystal cell gap of the reflection portions (R), the liquid crystal cell gap (d2) of the reflection portions (R) and the liquid crystal cell gap (d1) of the transmission portions (T) are in the ratio of 1:2.

Accordingly, the liquid crystal layer 131 at the reflection portions (R) exhibits a $\lambda/4$ phase delay effect, and the liquid crystal layer 131 at the transmission portions (T) exhibits a $\lambda/2$ phase delay effect. Thereby, there is no phase difference of an image reaching the surface of a screen.

The organic insulating layer 116 is formed at the same positions as those of the reflection electrodes 120, and is obtained by applying an organic insulating material, such as Benzocyclobutene (BCB) or acrylic resin.

As described above, the orientation of the liquid crystal layer 131 at the reflection portions (R), having the liquid crystal cell gap half that of the liquid crystal layer 131 at the transmission portions (T) by the organic insulating layer 116, is determined by the reflection electrodes 120 and the pixel electrodes 117 so that the liquid crystal display device is driven in the reflection mode, and the orientation of the liquid crystal layer 131 at the transmission portions (T) without the organic insulating layer 116 is determined by the common electrodes 124 and the pixel electrodes 117 so that the liquid crystal display device is driven in the transmission mode.

Hereinafter, a method for fabricating the in-plane switching liquid crystal display device of the present invention will be described.

FIGS. 7A to 7D are sectional views taken along line III-III' of FIG. 3, illustrating a process for fabricating the liquid crystal display device of FIG. 3.

Figure 7A:
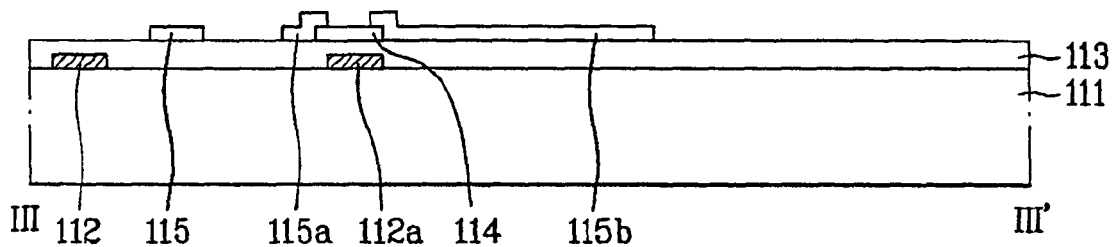
FIGS. 7A to 7D are sectional views taken along line III-III' of FIG. 3, illustrating a process for fabricating the liquid crystal display device of FIG. 3.

First, as shown in FIG. 7A, in order to prevent signal delay, a plurality of gate lines 112 and gate electrodes 112a are formed by depositing metal having a low resistance on the TFT array substrate 111 and patterning the deposited metal. Then, the gate insulating layer 113 is formed by depositing an inorganic insulating material, such as silicon oxide (SiOx) or silicon nitride (SiNx), on the overall surface of the TFT array substrate 111 including the gate lines 112 by plasma enhanced chemical vapor deposition (PECVD).

Thereafter, the semiconductor layer 114 is formed on the gate insulating layer 113 over the gate electrodes 112a by depositing amorphous silicon (a-Si:H) on the overall surface of the TFT array substrate 111 including the gate insulating layer 113 at a high temperature and patterning the deposited amorphous silicon, and a plurality of data lines 115 and the source and drain electrodes 115a and 115b are formed by depositing metal having a low resistance on the overall surface of the TFT array substrate 111 including the semiconductor layer 114 and patterning the deposited metal.

The data lines 115 and the gate lines 112, which orthogonally cross each other, define unit pixel regions. The source and drain electrodes 115a and 115b overlap the semiconductor layer 114. Thus, the gate electrodes 112a, the gate insulating layer 113, the semiconductor layer 114, the source and drain electrodes 115a and 115b form TFTs.

The metal having a low resistance, which is used to form the gate line and gate electrodes, the data line layer, is made of one selected from the group consisting of copper (Cu), aluminum (Al), Aluminum Neodymium (AlNd), molybdenum (Mo), chrome (Cr), titanium (Ti), tantalum (Ta), and molybdenum-tungsten (MoW).

Figure 7B:
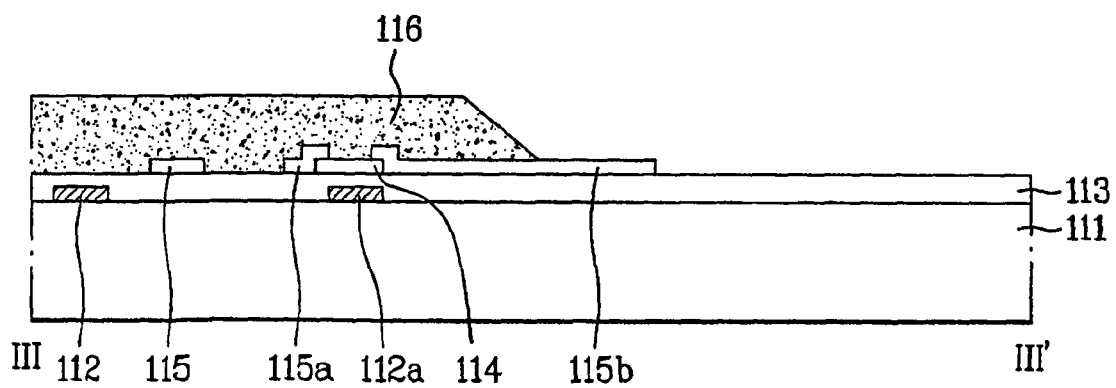

As shown in FIG. 7B, the organic insulating layer 116 is formed by coating an organic insulating material, such as BCB or acrylic resin, on the overall surface of the TFT array substrate 111 including the data lines 115, and patterning the coated organic insulating material so that the organic insulating material remains on the reflection portions. The organic insulating layer 116 is formed on the gate lines 112 and the data lines 115 and the TFTs such that the drain electrodes 115b of the TFTs are selectively exposed to the outside.

The organic insulating layer 116 is required to form the dual cell gap structure of the liquid crystal layer. In order to set the ratio of the liquid crystal cell gaps of the reflection portions and the transmission portions to 1:2, the organic insulating layer 116 has a thickness corresponding to the liquid cell gap of the liquid crystal layer at the reflection portions.

Figure 7C:
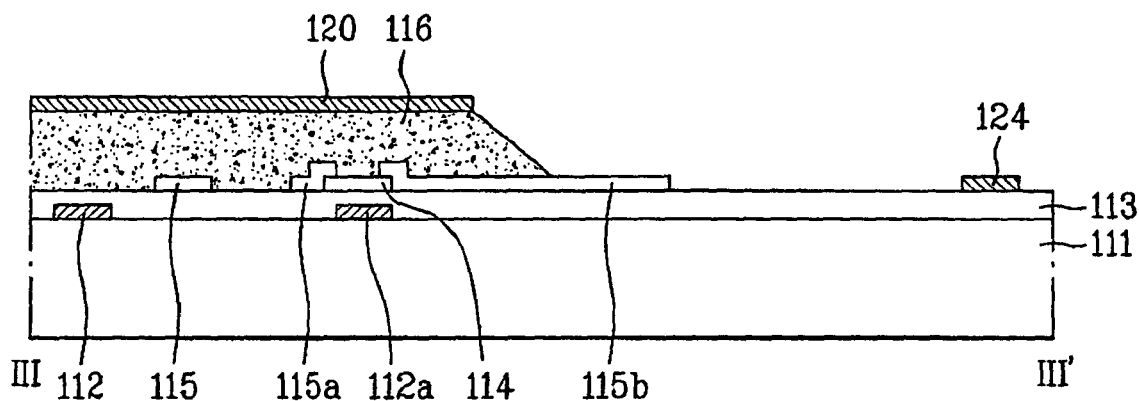

As shown in FIG. 7C, the reflection and common electrodes 120 and 124 are simultaneously formed by depositing a metal having excellent reflectance on the TFT array substrate 111 and patterning the deposited metal. The reflection electrodes 120 are formed on the organic insulating layer 116 at the reflection portions, and the common electrodes are formed at the transmission portions.

The reflection electrodes 120 are integrally formed with the common electrodes so that a Vcom signal is transmitted from a driving circuit portion to the reflection electrodes 120, and are not connected to the drain electrodes 115b exposed from the organic insulating layer 116 so that a pixel voltage is applied to the reflection electrodes 120.

On the other hand, as shown in FIG. 6, the reflection electrodes 120 and the common electrodes 124 may be formed in different layers. The common electrodes 124 may be simultaneously formed with the gate lines 112, and then the reflection electrodes 120 are formed on the gate insulating film. Specifically, when the gate lines 112 are formed, the common lines 125 parallel with the gate lines 112 and the common electrodes 124 extended from the common lines 125 are simultaneously formed, the gate insulating layer is formed thereon, and the reflection electrodes 120 are formed at the reflection portions including the common lines 125 on the insulating film. In this case, a Vcom signal is applied separately to the reflection electrodes 120 and the common electrodes 124.

Figure 7D:
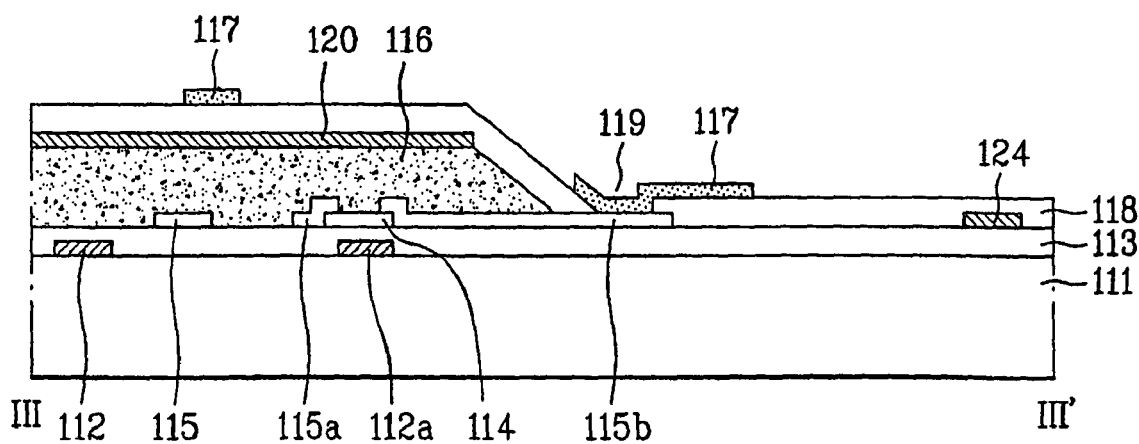

As shown in FIG. 7D, the passivation layer 118 is formed on the TFT array substrate 111 by depositing an inorganic insulating material, such as silicon oxide (SiOx) or silicon nitride (SiNx), on the overall surface of the TFT array substrate 111 including the reflection electrodes 120, and contact holes 119 are formed through the passivation layer 118 so that the drain electrodes 115b are exposed to the outside through the contact holes 119.

Finally, the pixel electrodes 117, which are electrically connected to the drain electrodes 115b through the contact holes 119, are formed by depositing a transparent conductive material, such as indium tin oxide (ITO) or indium zinc oxide (IZO), on the overall surface of the TFT array substrate 111 including the passivation layer 118 and patterning the deposited transparent conductive material. The pixel electrodes 117 at the transmission portions are disposed parallel with the common electrodes 124, and the pixel electrodes 117 at the reflection portions are disposed above the reflection electrodes 120.

Accordingly, the transversal electric fields, each generated between the common electrode 124 and the pixel electrode 117, are formed at the transmission portions so that the liquid crystal display device is driven in the transmission mode, and the transversal electric fields, each generated between the reflection electrode 120 and the pixel electrode 117, are formed at the reflection portions so that the liquid crystal display device is driven in the reflection mode.

For reference, as shown in FIG. 5, the transversal field may be formed by disposing the pixel electrodes 117 on the reflection electrodes above the gate lines 112, thereby improving the efficiency of the reflection mode. The pixel electrodes 117 formed at each of the unit pixel regions are integrally formed, are connected to the drain electrode 115b, and are arranged in parallel in one direction, thereby causing liquid crystal molecules to be arranged in the same orientation.

Thereafter, although not shown in the drawings, the color filter array substrate is attached to the above-mentioned TFT array substrate such that the two substrates face each other, and the liquid crystal layer is interposed between the two substrates, thereby completing the fabrication of the in-plane switching mode liquid crystal display device. The color filter array substrate comprises black matrices formed at portions, which have unstable electric fields and cannot correctly control liquid crystal, for preventing light leakage, and a color filter layer formed between the black matrices for representing R (red), G (green), B (blue) colors. Since the reflection electrodes are formed at the edges of the pixel regions where the black matrices are formed, the color filter array substrate need not comprise the black matrices.

The in-plane switching mode liquid crystal display device of the present invention further comprises orientation films formed on the inner surfaces of the TFT and color filter array substrates for setting initial arrangement of liquid crystal molecules, polarizing films formed on the outer surfaces of the TFT and color filter array substrates for polarizing light, and a compensating film interposed between the TFT array substrate and the polarizing film for ensuring black characteristics of the transmission portions. Although a compensating film may be interposed between the color filter array substrate and the polarizing film for performing the reflection mode, the liquid crystal display device of the present invention need not comprise such a compensating film.

Hereinafter, with reference to FIGS. 8 to 10, an arrangement of an optical system of the in-plane switching mode liquid crystal display device of the present invention and an optical route of the optical system will be described.

Figure 8:
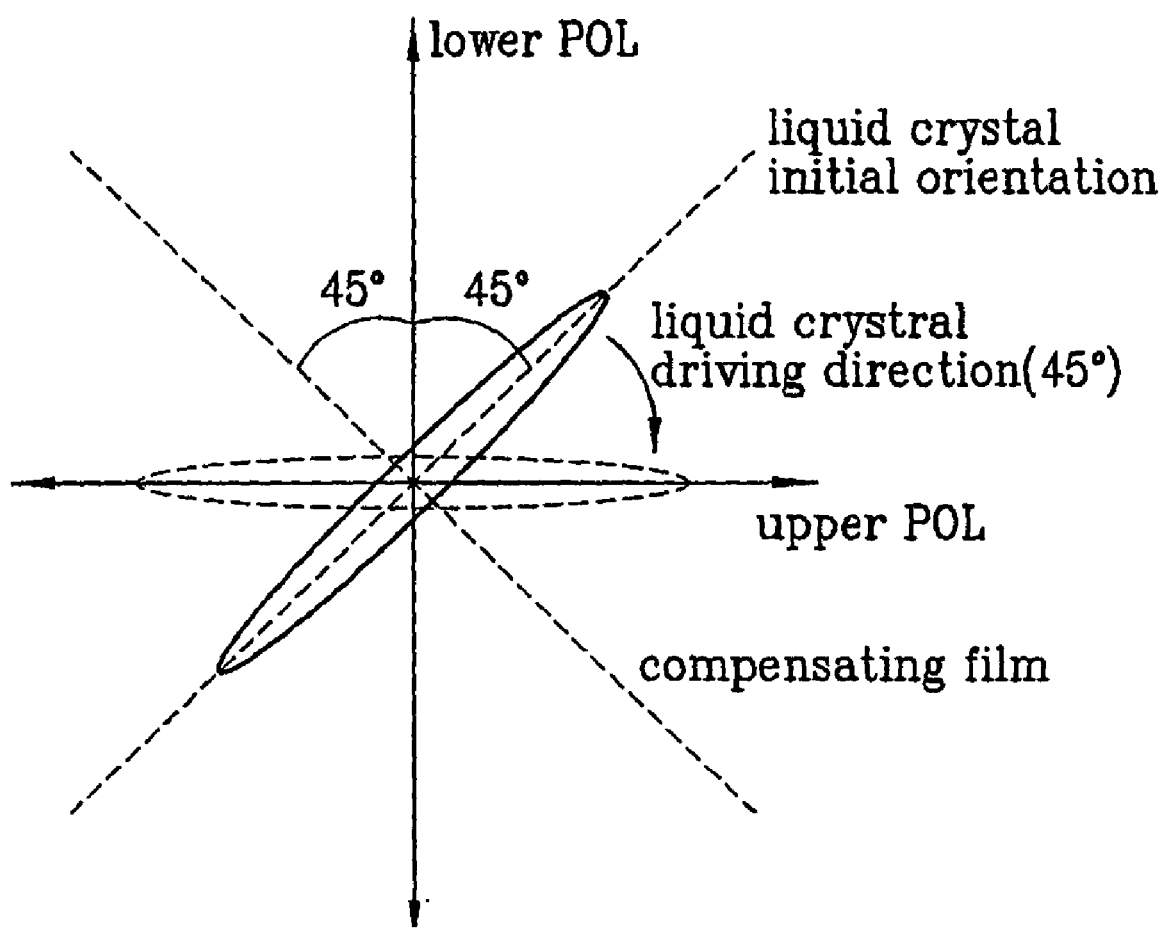
FIG. 8 is a schematic view of an optical system of the liquid crystal display device of the present invention.

FIG. 8 is a schematic view of the optical system of the liquid crystal display device of the present invention, FIG. 9 is a table illustrating the variation in the polarized state of reflection portions of the liquid crystal display device of the present invention, and FIG. 10 is a table illustrating the variation in the polarized state of transmission portions of the liquid crystal display device of the present invention.

The in-plane switching mode liquid crystal display device of the present invention is set to a normally black system by controlling polarizing optical axes of the polarizing films, an optical axis of the compensating film, and angles of directors of liquid crystal molecules. The liquid crystal cell gap structure of the liquid crystal layer 131 is controlled such that the liquid crystal layer at the reflection portions has a phase difference of $\lambda/4$ and the liquid crystal layer at the transmission portions has a phase difference of $\lambda/2$. A half wave plate (HWP) having a phase difference of $\lambda/2$ is used as the compensating film.

That is, as shown in FIG. 8, the upper polarizing film (hereinafter, referred to as "the upper POL") and the lower polarizing film (hereinafter, referred to as "the lower POL") are disposed such that the polarizing optical axes of the upper and lower POLs are perpendicular to each other, the initial orientation of liquid crystal molecules is at an angle of 45° between the upper and lower POLs, and the optical axis of the compensating film is disposed at an angle of 90° from the initial orientation of the liquid crystal molecules.

For example, when the polarizing optical axis of the upper POL is at an angle of about 0°, the polarizing optical axis of the upper POL is set to an angle of about 90°, the initial orientation of the liquid crystal molecules is set to an angle of about 45°, and the optical axis of the compensating film is set to an angle of about 135°.

When the liquid crystal layer is not driven, the liquid crystal layer at the reflection portions (R) exhibiting a λ/4 phase delay effect serves as a quarter wave plate (QWP) changing linearly polarized light into circularly polarized light or circularly polarized light into linearly polarized light, and the liquid crystal layer at the transmission portions (T) exhibiting a λ/2 phase delay effect serves as a half wave plate (HWP) changing the polarization of light in a symmetrical direction with respect to the liquid crystal layer. When the liquid crystal layer is driven, liquid crystal molecules are rotated at an angle of about −45° so that the angle of the orientation of the liquid crystal molecules coincides with the angle of the polarizing optical axis of the upper POL.

Now, an optical route of external natural light applied to the reflection portions of the above-mentioned device will be described. As shown in FIG. 9, when the liquid crystal layer is not driven (in an OFF state), external natural light incident upon the upper POL passes through the liquid crystal layer (exhibiting the λ/4 phase delay effect) so that the external natural light is changed into circularly polarized light, and reaches the reflection electrodes, and the circularly polarized light reflected by the reflection electrodes passes through the liquid crystal layer (exhibiting the λ/4 phase delay effect) again so that the circularly polarized light is changed into linearly polarized light. Since the polarized light passes through the liquid crystal layer exhibiting the λ/4 phase delay effect twice, the linearly polarized light is rotated at an angle of about 90°. That is, since the light is emitted in a direction at an angle of about 90° from the polarizing optical axis of the upper POL, the light does not pass through the upper POL, thereby implementing a black level.

On the other hand, when the liquid crystal layer is driven (in an ON state), the liquid crystal molecules are rotated and located at the same angle as the polarizing axis of the upper POL. Then, external natural light incident upon the upper POL passes through the liquid crystal layer without change, and reaches the reflection electrodes, and the natural light reflected by the reflection electrodes passes through the liquid crystal layer again without change of the optical axis, and is emitted in the same direction as the polarizing optical axis of the upper POL. Accordingly, the light finally passes through the upper POL, thereby implementing a white level.

An optical route of external natural light applied to the transmission portions of the above-mentioned device will be described now. As shown in FIG. 10, when the liquid crystal layer is not driven (in an OFF state), light incident from a lower backlight upon the lower POL passes through the compensating film (HWP, exhibiting the λ/2 phase delay effect) so that the light is rotated at an angle of 90°, passes through the liquid crystal layer (exhibiting the λ/2 phase delay effect) so that the light is rotated again at an angle of about 90°, and is emitted in the same direction as the polarizing optical axis of the lower POL. Accordingly, the light does not pass through the upper POL disposed at an angle of about 90° from the lower POL, thereby implementing a black level.

On the other hand, when the liquid crystal layer is driven (in an ON state), the liquid crystal molecules are rotated and disposed at the same angle as the polarizing axis of the upper POL. Light incident from the lower backlight upon the lower POL passes through the compensating film (HWP, exhibiting the λ/2 phase delay effect) so that the light is rotated at an angle of about 90°, and is emitted in the same direction as the polarizing optical axis of the upper POL. Thereafter, the light passes through the liquid crystal layer and the polarizing optical axis of the upper POL without change, thereby implementing a white level.

Figure 11:
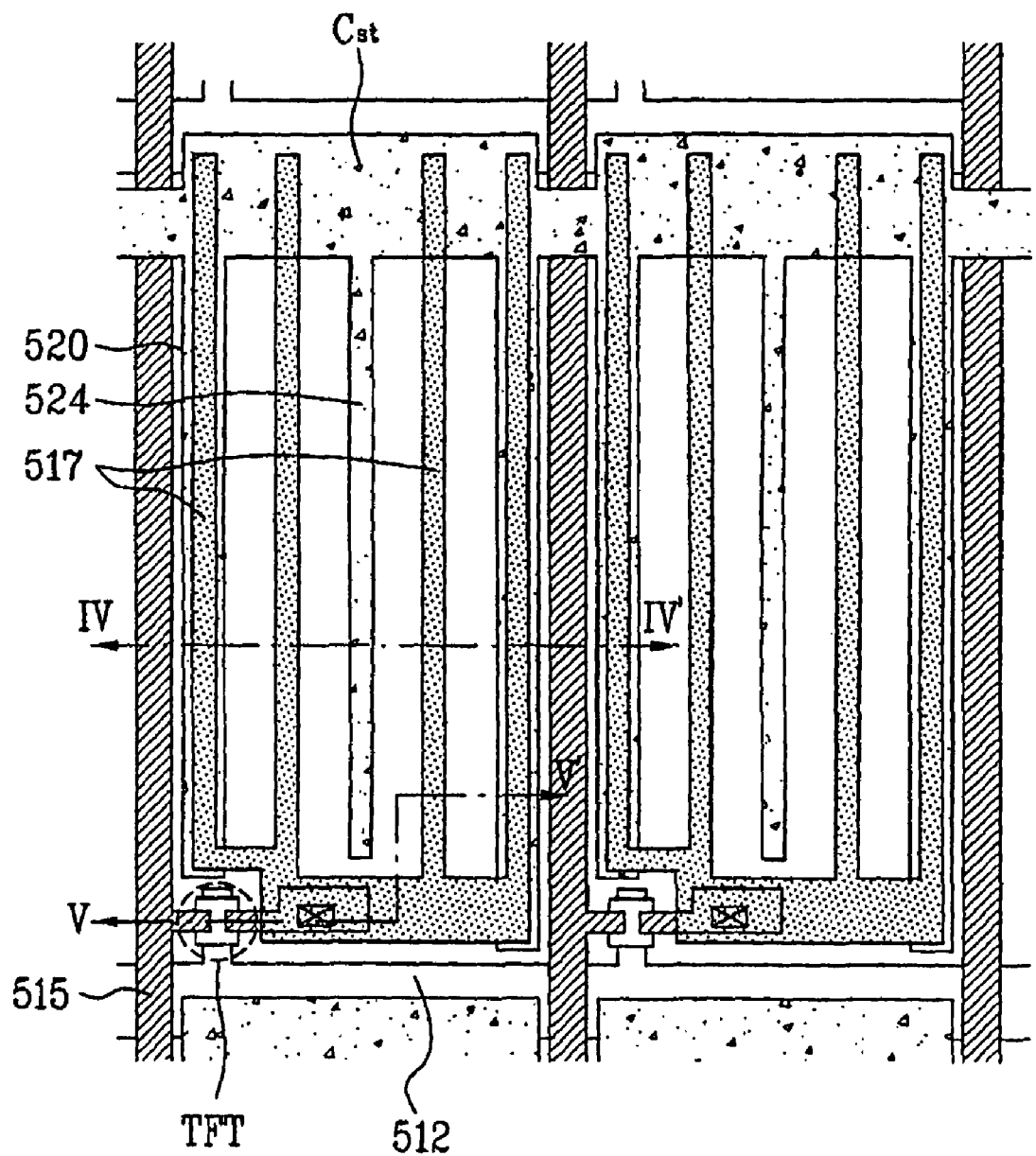
FIG. 11 is a plan view of an in-plane switching mode liquid crystal display device in accordance with a fourth embodiment of the present invention.
Figure 12:
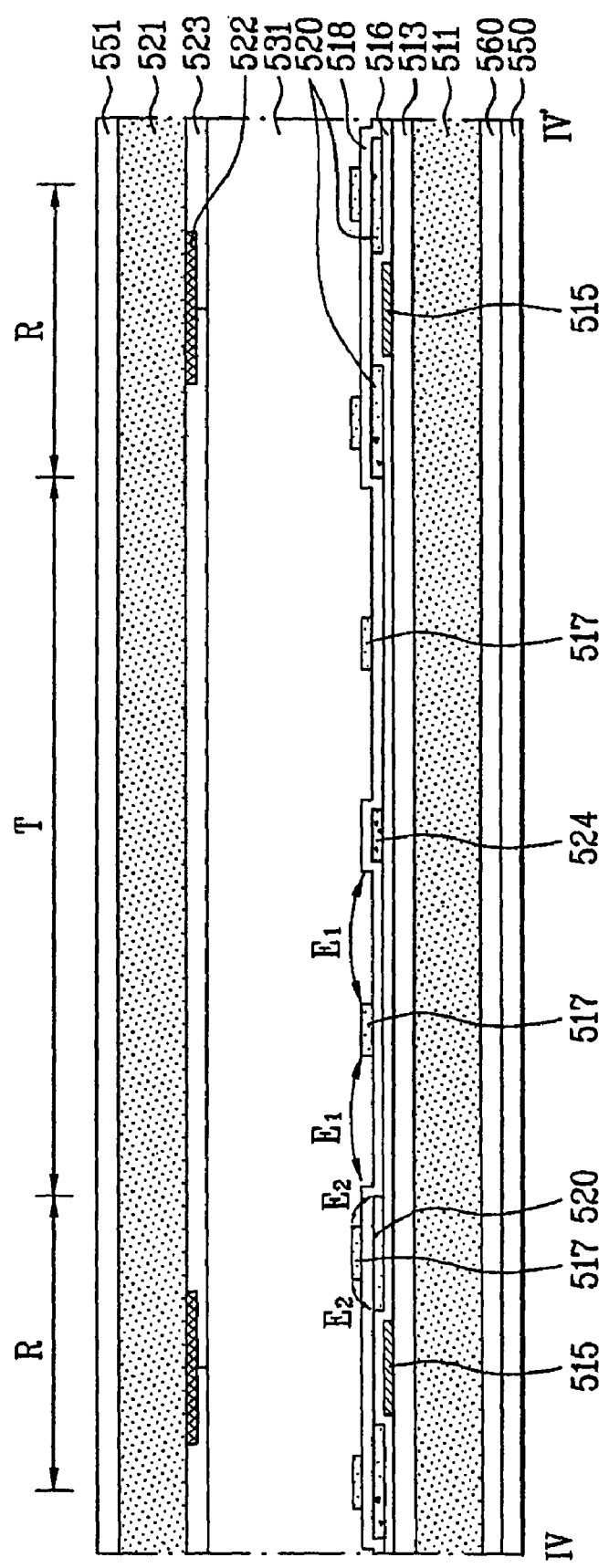
FIG. 12 is a sectional view taken along line IV-IV' of FIG. 11.

FIG. 11 is a plan view of an in-plane switching mode liquid crystal display device in accordance with a fourth embodiment of the present invention, FIG. 12 is a sectional view taken along line IV-IV' of FIG. 11, and FIGS. 13A to 13D are sectional views taken along line V-V' of FIG. 11, illustrating a process for fabricating the liquid crystal display device of FIG. 11.

Figure 14:
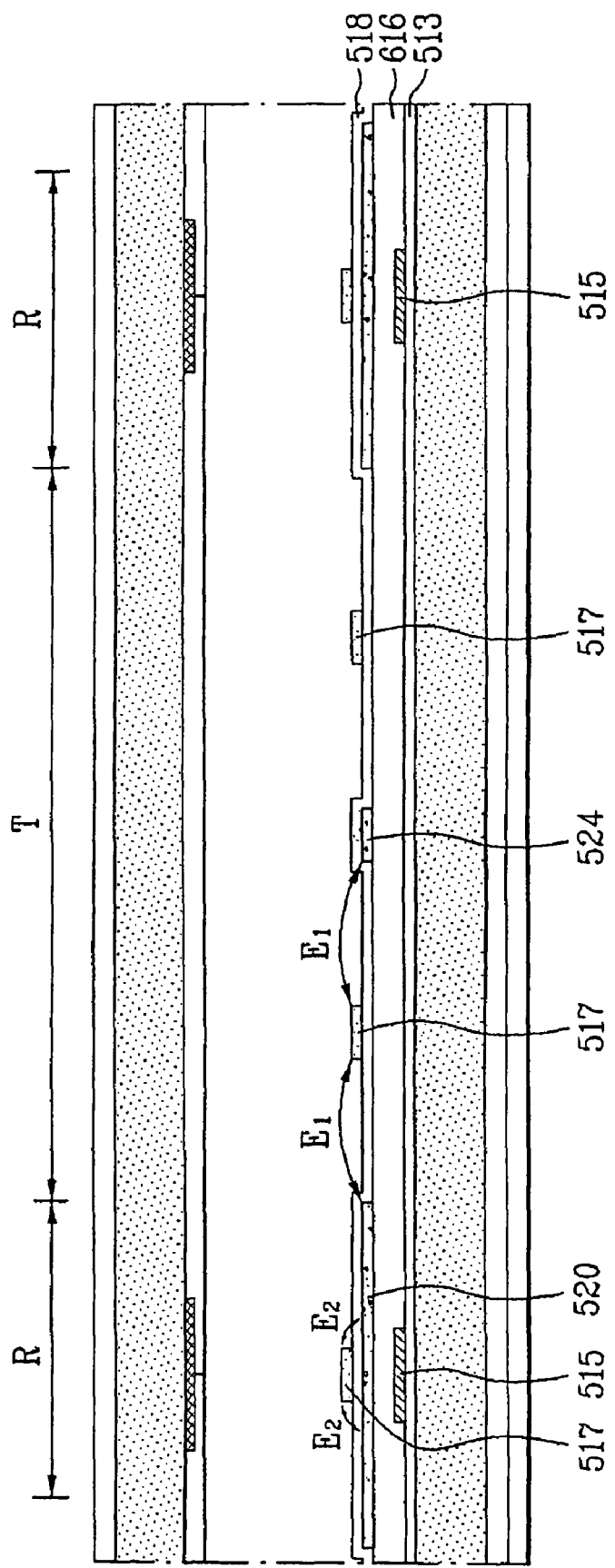
FIG. 14 is a plan view of an in-plane switching mode liquid crystal display device in accordance with a fifth embodiment of the present invention.

FIG. 14 is a plan view of an in-plane switching mode liquid crystal display device in accordance with a fifth embodiment of the present invention.

The in-plane switching mode liquid crystal display device in accordance with other embodiments of the present invention has a single liquid crystal cell gap structure regardless of the reflection portions (R) corresponding to the edges of the pixel regions and the transmission portions (T) corresponding to the inner parts of the pixel regions.

As shown in FIGS. 11 and 12, a TFT array substrate 511 comprises gate lines 512 and data lines 515 orthogonally crossing each other for defining unit pixel regions, a gate insulating layer 513 for insulating the gate and data lines 512 and 515 from each other, TFTs formed at the crossings of the gate and data lines 512 and 515, an inorganic insulating layer 516 formed on the overall surface of the TFT array substrate 511 including the TFTs, reflection electrodes 520 formed on the inorganic insulating layer 516 at the reflection portions, common electrodes 524 formed at the transmission portions, a passivation layer 518 formed on the overall surface of the TFT array substrate 511 including the reflection electrodes 520, and pixel electrodes 517 formed on the passivation layer 518 parallel with the common electrodes 524 for forming first transversal electric fields (E1) and formed above the reflection electrodes 520 for forming second transversal electric fields (E2).

A color filter array substrate 521 having black matrices 522 and a color filter layer 523 is attached to the TFT array substrate 511 such that the two substrates 521 and 511 face each other, and a liquid crystal layer 531 is interposed between the two substrates 521 and 511. First and second polarizing films 550 and 551 are respectively attached to outer surfaces of the two substrates 511 and 521. A compensating film 560 is attached between the TFT array substrate 511 and the first polarizing film 550, thereby ensuring black characteristics of the transmission mode.

The first transversal electric fields (E1), each generated between the common electrode 524 and the pixel electrode 517, control the liquid crystal layer 531 in the transmission mode in which a backlight is used as a light source, and the second transversal electric fields (E2), each generated between the reflection electrode 520 and the pixel electrode 517, control the liquid crystal layer 531 in the reflection mode in which external natural light is used as a light source. That is, the liquid crystal display device of the present invention can be driven in the semi-transmission mode.

Since the inorganic insulating layer 516 having high permittivity is formed between the data lines 515 and the reflection electrodes 520, when the data lines 515 and the reflection electrodes 520 overlap with each other, parasitic capacitance is generated therebetween, thereby exerting a negative influence on the quality of the screen. Accordingly, the reflection electrodes 520 do not overlap with the data lines 515, and are formed at both sides of the data lines 515.

The inorganic insulating layer 516 is made of an inorganic insulating material having permittivity of approximately 7.5, such as SiNx and SiOx, and has a thickness of about 1,500~5,000 Å.

However, when an organic insulating layer 616 having low permittivity is formed between the data lines 515 and the reflection electrodes 520, as shown in FIG. 14, parasitic capacitance is not generated therebetween. Accordingly, in this case, the reflection electrodes 520 are formed above the data lines 515 such that the reflection electrodes 520 overlap with the data lines 515.

The organic insulating layer 616 is made of an organic insulating material having permittivity of 3.4, such as Benzocyclobuten (BCB) and acrylic resin, and has a thickness of about 3~5 µm.

A Vcom voltage is applied to the reflection electrodes 520 so that the second transversal electric fields (E2) are generated between the reflection electrodes 520 and the pixel electrodes 517 formed above the reflection electrodes 520, thereby controlling the orientation of the liquid crystal in the reflection mode. The passivation layer 518 made of an inorganic insulating material is formed between the reflection electrodes 520 and the pixel electrodes 517, thereby insulating the reflection electrodes 520 and the pixel electrodes 517 from each other.

The dimensions of the reflection electrodes 520 are varied according to the ratio of the reflection portions (R) to the transmission portions (P). The reflection electrodes 520 are made of metal having high reflectance, such as aluminum (Al), copper (Cu), and chrome (Cr).

The common electrodes 524 and the pixel electrodes 517 are disposed in parallel at the transmission portions (T) so that the first transversal electric fields (E1) are generated between the common electrodes 524 and the pixel electrodes 517, thereby controlling the orientation of the liquid crystal in the transmission mode.

The common electrodes 524 are branched from common lines (not shown) formed in the same layer as that of the gate lines 512, thus receiving a Vcom signal. Otherwise, the common electrodes 524 are formed in the same layer as that of the reflection electrodes 520, thus receiving a Vcom signal simultaneously with the reflection electrodes 520. When the common electrodes 524 are formed in a different layer from that of the reflection electrodes 520, the reflection electrodes 520 at the inside or the outside of an active region contact the common electrodes 524 so that a Vcom signal is applied to the reflection electrodes 520, and are extended to overlap with the common lines (including the common electrodes 524), thereby additionally generating storage capacitance.

The pixel electrodes 517 formed above the reflection electrodes 520 and the pixel electrodes 517 disposed parallel with the common electrode 524 are integrally interconnected, and contact drain electrodes 515b of the TFTs. The pixel electrodes 517, the reflection electrodes 520, and the common electrodes 524 are disposed in parallel, thereby generating the first and second transversal electric fields (E1 and E2) in the same direction. Thus, the orientation of the liquid crystal molecules at the reflection portions (R) is equal to that of the liquid crystal layer 531 at the transmission portions (T).

At this time, the pixel electrodes 517 are extended to overlap with the gate lines 512 or reflection electrodes 520, thereby forming storage capacitors (Cst) by means of the gate lines 512, the pixel electrodes 517, and the gate insulating layer 513 and the inorganic insulating layer 516, formed between the gate lines 512 and the pixel electrodes 517. Storage capacitors are further formed by means of the reflection electrodes 520, the pixel electrodes 517, and the inorganic insulating layer 516, formed between the reflection electrodes 520 and the pixel electrodes 517.

The above-mentioned in-plane switching mode liquid crystal display device, which comprises the inorganic insulating layer or the organic insulating layer having a designated stepwise structure between the data lines and the reflection electrodes and has a uniform liquid crystal cell gap structure, exhibits the same phase delay effect of the liquid crystal layer at the reflection and transmission portions. In the embodiments of the present invention, the liquid crystal layer exhibits a λ/4 phase delay effect.

Hereinafter, a method for fabricating the above-mentioned in-plane switching liquid crystal display device will be described.

Figure 13A:
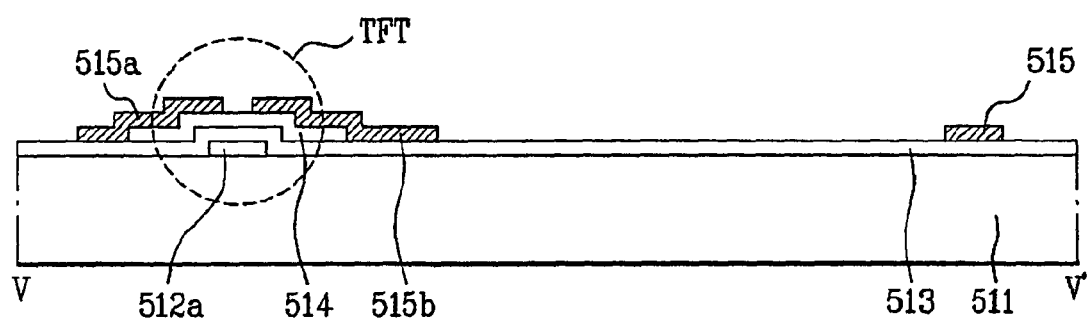
FIGS. 13A to 13D are sectional views taken along line V-V' of FIG. 11, illustrating a process for fabricating the liquid crystal display device of FIG. 11.

First, as shown in FIG. 13A, a plurality of gate lines 512 (in FIG. 11) and gate electrodes 512a are formed on the TFT array substrate 511 by depositing metal having a low resistance on the TFT array substrate 511 and patterning the deposited metal. The gate insulating layer 513 is formed on the TFT array substrate 511 by depositing an inorganic insulating material on the overall surface of the TFT array substrate 511 including the gate electrodes 512a.

A semiconductor layer 514 is formed on the gate insulating layer 513 on the gate electrodes 512a by depositing amorphous silicon (a-Si:H) on the overall surface of the TFT array substrate 511 including the gate insulating layer 513 at a high temperature and patterning the deposited amorphous silicon, and a plurality of the data lines 515 and the source and drain electrodes 515a and 515b are formed by depositing metal having a low resistance on the overall surface of the TFT array substrate 511 including the semiconductor layer 514 and patterning the deposited metal.

Here, the gate electrodes 512a, the gate insulating layer 513, the semiconductor layer 514, and the source and drain electrodes 515a and 515b form TFT transistors.

Figure 13B:
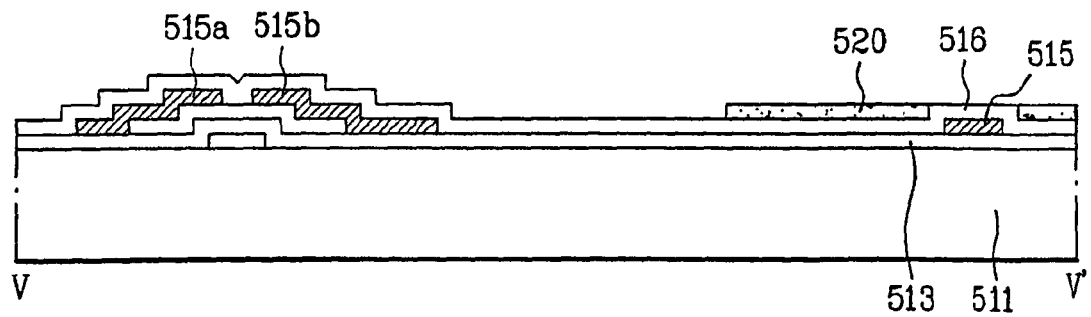

As shown in FIG. 13B, the inorganic insulating layer 516 is formed by depositing an inorganic insulating material, such as SiOx or SiNx, on the overall surface of the TFT array substrate 511 including the drain electrodes 515b by PECVD.

Then, the reflection electrodes 520 and the common electrodes 524 (in FIG. 11) are simultaneously formed. By depositing metal having excellent reflectance on the TFT array substrate 511 and patterning the deposited metal, the reflection electrodes 520 are formed at both sides of the data lines 515 and the common electrodes 524 are formed parallel with the long axes of the reflection electrodes 520. Regions of the TFT array substrate 511 in which the reflection electrodes are disposed become reflection regions, and other regions of the TFT array substrate 511 become transmission portions.

On the other hand, when an organic insulating layer having low permittivity is formed on the overall surface of the TFT array substrate 511 including the data lines 515, the reflection electrodes 520 may be formed on the TFT array substrate 511 such that the reflection electrodes 520 overlap the data lines 515.

Figure 13C:
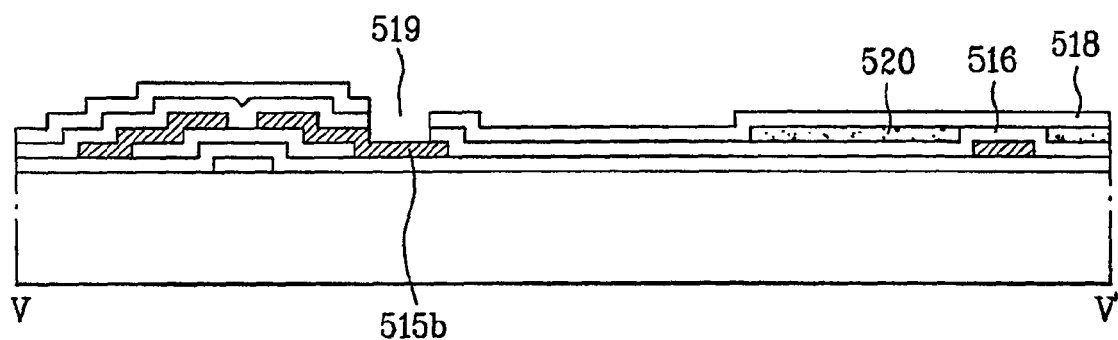

As shown in FIG. 13C, the passivation layer 518 is formed by depositing an inorganic insulating material on the overall surface of the TFT array substrate 511 including the reflection electrodes 520, and contact holes 519 are formed through the insulating layer 516 so that the drain electrodes 515b are exposed to the outside through the contact holes 519.

Figure 13D:
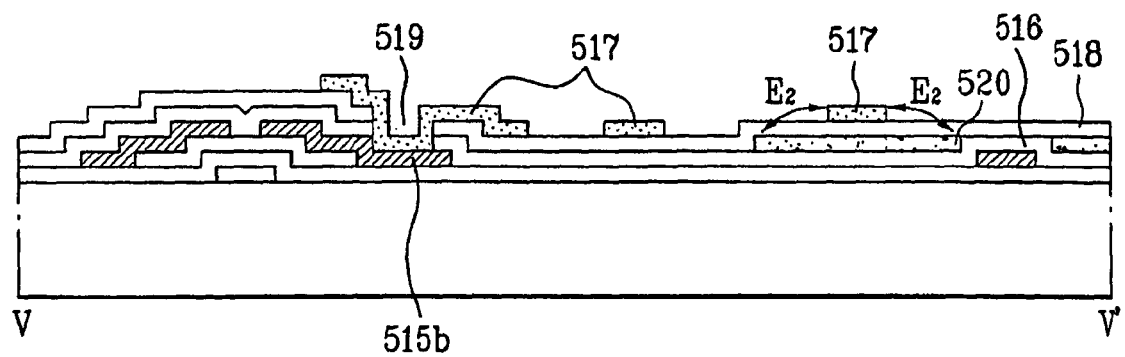

Finally, as shown in FIG. 13D, the pixel electrodes 517 electrically connected to the drain electrodes 515b through the contact holes 519 are formed on the TFT array substrate 511 by depositing a transparent conductive material, such as ITO or IZO, on the overall surface of the TFT array substrate 511 including the passivation layer 518 and patterning the deposited transparent conductive material. The pixel electrodes 517 at the transmission portions are disposed parallel with the common electrodes 524, and the pixel electrodes 517 at the reflection portions are disposed above the reflection electrodes 520.

Accordingly, the first transversal electric fields (E1), each generated between the common electrode 524 (in FIG. 11) and the pixel electrode 517, are formed at the transmission portions, and the second transversal electric fields (E2), each generated between the reflection electrode 520 and the pixel electrode 517, are formed at the reflection portions. Here, since a Vcom signal is applied to the reflection electrodes 520, the first transversal fields (E1) are generated between the reflection electrodes 520 and the neighboring pixel electrodes 517.

Although not shown in the drawings, the color filter array substrate is attached to the TFT array substrate by means of the liquid crystal layer interposed therebetween. The liquid crystal display device of the present invention further comprises orientation films formed on the inner surfaces of the two substrates for setting initial arrangement of liquid crystal molecules, polarizing films formed on the outer surfaces of the two substrates for polarizing light, and a compensating film interposed between the TFT array substrate and the polarizing film for ensuring black characteristics of the transmission portions.

The in-plane switching mode liquid crystal display device of the present invention is set to a normally black system by controlling polarizing optical axes of the polarizing films, an optical axis of the compensating film, and angles of directors of liquid crystal molecules. The upper and lower POLs formed on the outer surfaces of the color filter and TFT array substrates are disposed such that the polarizing optical axes of the upper and lower POLs are perpendicular to each other. The liquid crystal cell gap structure of the liquid crystal layer is controlled such that the liquid crystal layer at the reflection and transmission portions (R and T) has the same phase difference of $\lambda/4$, and the compensating film has the same phase difference of $\lambda/4$.

Here, the initial orientation of liquid crystal molecules of the liquid crystal layer is at an angle of 45° between the upper and lower POLs, and the optical axis of the compensating film is disposed at an angle of 90° from the initial orientation of the liquid crystal molecules.

For reference, when the liquid crystal layer at the reflection portions meets the upper or lower polarizing films at an angle of about 45°, the reflection portions form black conditions in which the reflectance is minimized, and when the angle between the liquid crystal layer and the upper or lower polarizing films is deviated from the angle of about 45°, the reflectance of the reflection portions is changed.

When the compensating film and the liquid crystal layer at the transmission portions have the same phase difference, the optical axes of the compensating film and the liquid crystal layer are perpendicular to each other, and the optical axes of the upper and lower polarizing films are perpendicular to each other, light does not pass through the transmission portions. When the optical axis of the liquid crystal layer is rotated so that the optical axes of the compensating film and the liquid crystal layer are in parallel, the transmission portions have maximal luminance. For the reason, the orientation films are rubbed so that the orientation films and the pixel electrodes form an angle of about 0~10°. For example, when the angle between the optical axes of the compensating film and the liquid crystal layer at the transmission portions is about 70°, the variation in the transmittance is about 88%, when the angle therebetween is about 80°, the variation in the transmittance is about 97%, and when the angle therebetween is about 90°, the variation in the transmittance is about 100%. Although the angle between the optical axes of the compensating film and the liquid crystal layer at the transmission portions is less than about 90°, the decrease in the luminance is not high. However, it is proper to design the in-plane switching mode crystal display device according to the optical rule.

An optical route of external natural light applied from the outside to the above-mentioned in-plane switching mode liquid crystal display device is similar or equal to that of the in-plane switching mode liquid crystal display device of the first embodiment.

As described above, in the in-plane switching mode liquid crystal display device of the present invention, which is driven in the semi-transmission mode, a Vcom voltage is applied to the reflection electrodes of the reflection portions and a pixel voltage is applied to the pixel electrodes disposed above the reflection electrodes at the reflection portions, thereby causing the liquid crystal layer to be driven by the reflection electrodes.

As apparent from the above description, the in-plane switching mode liquid crystal display device and method for fabricating the same of the present invention exhibits several effects, as follows.

First, since a Vcom signal is applied to reflection electrodes formed at edges of pixel regions and pixel electrodes are additionally disposed above the reflection electrodes, the liquid crystal display device of the present invention generates transversal electric fields at the edges of the pixel regions, thereby allowing liquid crystal molecules to be arranged in a desired direction in a reflection mode.

Accordingly, the loss in transmittance at the reflection portions is reduced and reflectance at the reflection portions is improved.

Second, since the reflection electrodes are formed on gate lines as well as data lines and the pixel electrodes are additionally disposed above the reflection electrodes, the liquid crystal display device of the present invention generates second transversal electric fields due to the interaction between the reflection electrodes and the pixel electrodes on the gate lines.

Accordingly, the efficiency of the liquid crystal display device of the present invention in the reflection mode is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for fabricating an in-plane switching mode liquid crystal display device comprising:

forming gate lines on a first substrate; forming a gate insulating layer on an overall surface of the first substrate including the gate lines; forming data lines crossing the gate lines and defining pixel regions that are divided into reflection portions and transmission portions, wherein the transmission portions correspond to inner parts of the pixel regions and the reflection portions correspond to edges of the pixel regions; forming thin film transistors at the crossings of the gate lines and the data lines; forming common electrodes at the transmission portions of the pixel regions; forming reflection electrodes at the reflection portions of the pixel regions, wherein the common electrodes are integrally formed with the reflection electrodes in a same layer; forming a passivation layer on the overall surface of the first substrate including the reflection electrodes; forming pixel electrodes on the passivation layer parallel with the common electrodes and pixel electrodes overlapping the reflection electrodes; attaching a second substrate to the first substrate such that the first and second substrates face each other, and forming a liquid crystal layer there between;

attaching first and second polarizing films, respectively, to outer surfaces of the first and second substrates; and attaching a compensating film between the first substrate and the first polarizing film, wherein the first and second polarizing films are disposed such that polarizing optical axes thereof are perpendicular to each other; an orientation of the liquid crystal layer initially has an angle of about 45° from the polarizing optical axis of the second polarizing film, and coincides with the polarizing optical axis when the liquid crystal layer is driven; and the compensating film is disposed such that that the optical axis thereof meets the liquid crystal layer at an angle of about 90°.

2. The method of claim 1, wherein the reflection electrodes extend so as to overlap the gate lines.

3. The method of claim 1, wherein the reflection electrodes extend so as to overlap with the data lines.

4. The method of claim 1, further comprising forming an organic insulating layer between the data lines and the reflection electrodes.

5. The method of claim 4, wherein the organic insulating layer is made of BCB or acrylic resin.

6. The method of claim 4, wherein the organic insulating layer is formed only at the reflection portions, and has a thickness equal to the liquid crystal layer, wherein a ratio of gaps of the liquid crystal layer at the reflection portions to the transmission portions is 1:2.

7. The method of claim 4, wherein the organic insulating layer is formed on the overall surface of the first substrate.

8. The method of claim 1, further comprising forming an inorganic insulating layer between the data lines and the reflection electrodes.

9. The method of claim 8, wherein the inorganic insulating layer is made of silicon nitride or silicon oxide.

10. The method of claim 8, wherein the reflection electrodes do not overlap the data lines and are formed at both sides of the data lines.

11. The method of claim 1, wherein the pixel electrodes are formed integrally in parallel and contact the thin film transistors.

12. The method of claim 1, wherein the common electrodes extend from common lines formed in a same layer as the gate lines.

13. The method of claim 1, wherein the reflection electrodes are formed to electrically connect to the common electrodes.

14. The method of claim 1, wherein the reflection electrodes are made of a conductive material having reflection characteristics.

15. The method of claim 1, wherein the pixel electrodes are made of a transparent conductive material.

* * * * *